United States Patent
Shibuya et al.

(10) Patent No.: US 7,447,139 B2
(45) Date of Patent: Nov. 4, 2008

(54) LIGHT-RECEIVING ELEMENT, OPTICAL HEAD, OPTICAL RECORDING/REPRODUCING APPARATUS, AND METHOD OF OPTICAL RECORDING AND REPRODUCTION

(75) Inventors: Giichi Shibuya, Tokyo (JP); Teiichiro Oka, Tokyo (JP); Koji Mishima, Tokyo (JP); Daisuke Yoshitoku, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 669 days.

(21) Appl. No.: 11/097,236

(22) Filed: Apr. 4, 2005

(65) Prior Publication Data

US 2005/0237904 A1   Oct. 27, 2005

(30) Foreign Application Priority Data

Apr. 15, 2004   (JP) ............................. 2004-120671

(51) Int. Cl.
    *G11B 7/00*   (2006.01)
(52) U.S. Cl. .................................... 369/120; 369/44.42
(58) Field of Classification Search .................. 369/94, 369/44.41, 44.42, 120
    See application file for complete search history.

(56) References Cited

U.S. PATENT DOCUMENTS

| 5,093,821 A | 3/1992 | Katayama et al. |
| 7,193,955 B2 * | 3/2007 | Ito et al. .................. 369/44.41 |
| 7,245,570 B2 * | 7/2007 | Kurokawa et al. ....... 369/44.41 |

FOREIGN PATENT DOCUMENTS

| JP | 02-158930 A | 6/1990 |
| JP | A-05-036146 | 2/1993 |
| JP | 09-050640 A | 2/1997 |
| JP | B2 2624255 | 4/1997 |
| JP | 10-261238 A | 9/1998 |
| JP | A 11-016200 | 1/1999 |
| JP | 2002-131618 A | 5/2002 |
| JP | A 2002-319177 | 10/2002 |
| JP | 2005-122795 A | 5/2005 |

* cited by examiner

*Primary Examiner*—Thang V Tran
(74) *Attorney, Agent, or Firm*—Oliff & Berridge, PLC (57) ABSTRACT

The invention relates to a light-receiving element for receiving a reflection of laser light irradiated to a rotating multi-layer recording medium having a plurality of information recording layers stacked one over another and for converting the light into an electrical signal, an optical head having the element for recording information in the multi-layer recording medium or reproducing information recorded therein, and an optical recording/reproducing apparatus and a method of optical recording and reproduction. The invention provides a light-receiving element, an optical head, an optical recording/reproducing apparatus, and a method of optical recording and reproduction which make it possible to eliminate a noise component superimposed on reflected light from a multi-layer recording medium to reproduce an RF signal of high quality. The light receiving element receives a reflection of laser light irradiated through an objective lens to a rotating multi-layer recording medium having a plurality of information recording layers stacked one over another through a return path optical system and converts the reflected light into an electrical signal. The element has a first light-receiving section having a circular light-receiving region and a second light-receiving section disposed adjacent to the outer circumference of the first light-receiving section in the form of a circle concentric therewith.

13 Claims, 6 Drawing Sheets

LIGHT-RECEIVING ELEMENT, OPTICAL HEAD, OPTICAL RECORDING/REPRODUCING APPARATUS, AND METHOD OF OPTICAL RECORDING AND REPRODUCTION

BACKGROUND OF THE INVENTION

1. Field of the Invention

The present invention relates to a light-receiving element for receiving a reflection of laser light irradiated to a rotating multi-layer recording medium having a plurality of information recording layers stacked one over another and converting the reflected light into an electrical signal, an optical head having the element and recording information in a multi-layer recording medium or reproducing information recorded therein, an optical recording/reproducing apparatus, and a method of optical recording and reproduction.

2. Description of the Related Art

An optical recording/reproducing apparatus has an optical head which is formed along the circumferential direction of, for example, a disk-shaped optical recording medium (optical disk) and which records information in predetermined regions of a plurality of tracks formed in the radial direction of the optical recording medium or reproduces information recorded in predetermined regions of the tracks. Optical heads include recording-only types which are used only for recording information in an optical recording medium, reproduction-only types which are used only for reproducing information, and recording/reproduction types which can be used for both recording and reproduction. Therefore, apparatus loaded with those types of heads respectively constitute optical recording apparatus, optical reproducing apparatus, and optical recording/reproducing apparatus. In this specification, the term "optical recording/reproducing apparatus" will be used as a general term that implies all of those apparatus.

Patent Documents 1 and 2 disclose optical heads and optical disk apparatus for performing reproduction from a multi-layer optical disk having a plurality of recording layers for recording information. In the optical heads and optical disk apparatus, light reflected from a multi-layer optical disk (return light) is split into two or more optical paths which are converged on separate light-receiving sections. The light-receiving section for a first beam of light receives the entire light beam, and the light-receiving section for a second beam of light receives a central part or peripheral part of the light beam. Electrical signals obtained by photoelectrical conversion at the first and second light-receiving sections, respectively, are subjected to a differential operation at a differential amplification circuit to reproduce a reproduction signal (RF signal). A method is also disclosed, in which the second light beam is used as a focus error signal. The method for reducing inter-layer crosstalks in a multi-layer optical disk using a differential amplification circuit is advantageous in that it serves the purpose of reducing the size of an optical head and an optical disk apparatus because the method involves no focal point in a return path optical system except a light-receiving section and therefore allows an optical system to have a short optical path unlike the method disclosed in Patent Document 3 for reducing inter-layer crosstalks by using a confocal optical head.

[Patent Document 1] JP-A-1999-16200
[Patent Document 2] JP-A-2002-319177
[Patent Document 3] Japanese Patent No. 2624255

According to the method disclosed in Patent Document 1, however, one of two light beams split to perform a differential operation must be received by a light-receiving element disposed in a position where a reflected light beam from a recording layer to be reproduced (reproduced layer) converges, and the other light beam must be received by a light-receiving element disposed in a position where an inner circumferential part of a reflected light beam from a recording layer adjacent to the reproduced layer converges. Since it is not possible to dispose both of the elements in one optical path, a problem arises in that optical elements are required redundantly. According to the method disclosed in Patent Document 2, a light beam is split by two light-receiving elements into inner and outer circumferential parts, and a resultant differential signal is output as an RF signal. The method serves the purpose of providing a compact optical head because a light beam can be split by two light-receiving elements located close to each other. However, no sufficient study has been made on the size of the light-receiving elements and the configuration of the light-receiving elements to perform the splitting. There is a limitation on electrical signals to be subjected to a differential operation in that they must originate only in reflected beams from particular layers (adjoining layers), and no study has been made on how to reduce inter-layer crosstalks in a multi-layer optical disk having three or more recording layers effectively.

Figure 9:
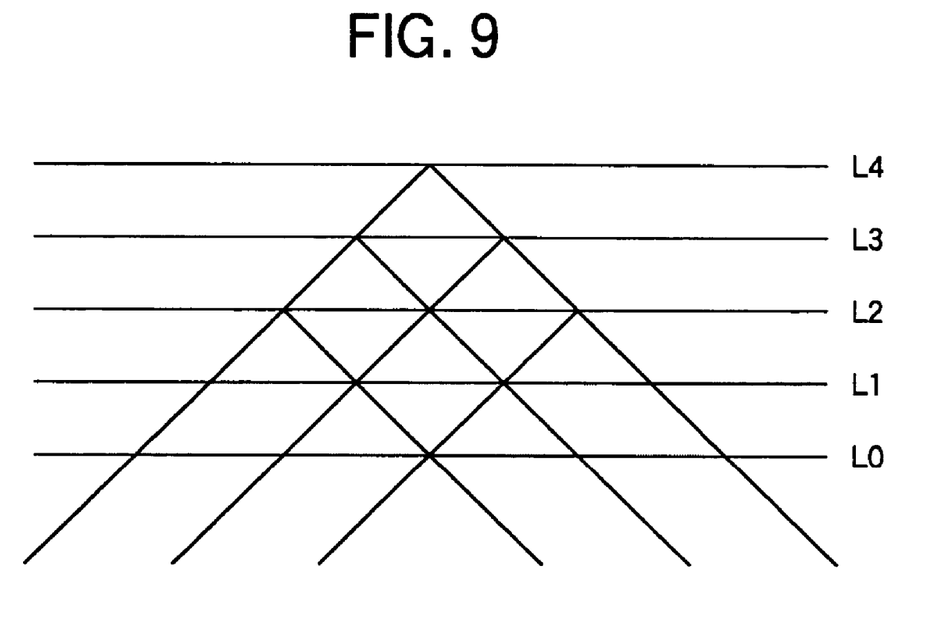
FIG. 9 is an illustration for explaining inter-layer crosstalks which can generate noise signals in a multi-layer optical disk according to the related art.

In a multi-layer optical disk having three or more layers, reflected light (return light) from a layer adjacent to a layer under reproduction does not necessarily constitute the inter-layer crosstalk having the most significant influence on the reproduction of an RF signal. FIG. 9 is an illustration for explaining inter-layer crosstalks which can generate noise signals in a multi-layer optical disk. Referring to FIG. 9, let us assume that a recording layer L4 is a reproduced layer from which recorded information is to be reproduced; recording layers L0 and L3 are recorded regions; and a recording layer L2 is an unrecorded region. In general, the quantity of return light attributable to reflection at an unrecorded region is greater than the quantity of return light from a recorded region.

When light irradiating the multi-layer optical disk is focused on the recording layer L4 to reproduce the information recorded on the recording layer L4, reflected light from the recording layer L3 is focused near the recording layer L2. Since the recording layer L3 and the recording layer L2 are a recorded region and an unrecorded region, respectively, the resultant inter-layer crosstalk has a relatively small influence on the signal reproduced from the recording layer L4. Reflected light from the recording layer L2 is focused near the recording layer L0, and the recording layer L0 is a recorded region. Therefore, the resultant inter-layer crosstalk has a more significant influence on the signal reproduced from the recording layer L4. Therefore, the reflected light from the recording layer L2 that is further from the recording layer L4 constitutes a more significant inter-layer crosstalk than the reflected light from the recording layer L3 adjacent to the recording layer L4, the inter-layer crosstalk having the most significant influence on an RF signal from the recording layer L4 to be reproduced and constituting a source of noises. Thus, the recording layer that generates the reflected light by which inter-layer crosstalk occurs acting as the most dominant noise source varies depending on whether each of the recording layers in the optical path is recorded or not. In this case, the return light includes noise components from other recording layers to be eliminated as reflected light components which are defocused from the position in focus by an amount that is twice an optical distance between the layers. No consideration on this point is seen in Patent Document 2.

SUMMARY OF THE INVENTION

It is an object of the invention to provide a light-receiving element, an optical head, an optical recording/reproducing apparatus, and a method of optical recording and reproduction which make it possible to eliminate noise components superimposed on reflected light from a multi-layer recording medium and to thereby reproduce an RF signal of high quality.

The above-described object is achieved by a light receiving element characterized in that it receives a reflection of laser light irradiated through an objective lens to a rotating multi-layer recording medium having a plurality of information recording layers stacked one over another through a return path optical system and converts the reflected light into an electrical signal, the element comprising a first light-receiving section having a circular light-receiving region and a second light-receiving section disposed adjacent to an outer circumference of the first light-receiving section.

The invention provides a light-receiving element characterized in that a frequency of an electrical signal output from the first light-receiving section includes a frequency of an electrical signal output from the second light-receiving section.

The invention provides a light-receiving element characterized in that it satisfies a following relational expression:

$$\pi(0.5\lambda/(NA/\beta))^2 \leq S_1 \leq \pi(0.24 d \cdot \beta \cdot NA/n)^2$$

where $\lambda$ represents the wavelength of the laser light; d represents the distance between recording layers of the multi-layer recording medium; n represents the refractive index of a light-transmitting layer between the recording layers; NA represents the numerical aperture of the objective lens; $\beta$ represents the lateral magnification of the return path optical system; and $S_1$ represents the surface area of the light-receiving region of the first light-receiving section.

The invention provides a light-receiving element characterized in that a light-receiving region of the second light-receiving section is formed in a form of a concentric circle around the outer circumference of the first light-receiving section.

The invention provides a light-receiving element characterized in that it satisfies a following relational expression:

$$S_m \geq \pi(1.1(m-1) \cdot d \cdot \beta \cdot NA/n)^2$$

where $S_m$ represents a sum of the surface area of the light-receiving region of the first light-receiving section and the surface area of the light-receiving region of the second light-receiving section up to the light-receiving region that is in an m-th place ($m \geq 2$) when counted from the light-receiving region of the first light-receiving section.

The invention provides a light-receiving element characterized in that it comprises a differential amplification circuit having a non-inverting input terminal to which the electrical signal output from the first light-receiving section is input and an inverting input terminal to which a noise signal output from the second light-receiving section is input, the differential amplification circuit performing a differential operation between the electrical signal and the noise signal.

The invention provides a light-receiving element characterized in that the noise signal originates in an inter-layer crosstalk that occurs between reflected light from a recording layer of the multi-layer recording medium to be reproduced and reflected light from a recording layer of the multi-layer recording medium other than the recording layer to be reproduced.

The invention provides a light-receiving element characterized in that the electrical signal includes an RF signal including information recorded on the recording layer to be reproduced and the noise signal.

The invention provides a light-receiving element characterized in that the differential amplification circuit has a noise signal selection circuit for selecting a noise signal output from the light-receiving region of the second light-receiving section in the m-th ($m \geq 2$) place when counted from the first light-receiving section toward the outer circumference of the element.

The invention provides a light-receiving element characterized in that the differential amplification circuit has a switch for switching the electrical signal to input the signal to either the non-inverting input terminal or the inverting input terminal, an arithmetic circuit section for performing a calculation on the electrical signal and the noise signal selected by the noise signal selection circuit, and an output terminal from which a signal obtained by the calculation at the arithmetic circuit section is output.

The invention provides a light-receiving element characterized in that the differential amplification circuit has an input terminal to which an output signal from a logic circuit is input and in that the opening and closing of the switch is controlled by a logical input from the logic circuit.

The above-described object is achieved by an optical head characterized in that it comprises a light-receiving element according to the invention.

The invention provides an optical head characterized in that the light-receiving element is used as a light-receiving element for monitoring laser power.

The above-described object is achieved by an optical recording/reproducing apparatus characterized in that it comprises an optical head according to the invention.

The above-described object is achieved by a method of optical recording and reproduction characterized in that it comprises the steps of irradiating a rotating multi-layer recording medium having a plurality of information recording layers stacked one over another with laser light, receiving reflected light of the laser light reflected by a recording layer of the multi-layer recording medium to be reproduced and converting the reflected light into an electrical signal at a first light-receiving section having a circular light-receiving region, receiving reflected light of the laser light reflected by a recording layer other than the recording layer to be reproduced and converting the reflected light into a noise signal at a second light-receiving section disposed adjacent to the outer circumference of the first light-receiving section, and extracting an RF signal by performing a differential operation between the electrical signal and the noise signal.

The invention provides a method of optical recording and reproduction characterized in that the noise signal originates in an inter-layer crosstalk that occurs between reflected light from the recording layer to be reproduced and the reflected light from the recording layer other than the recording layer to be reproduced.

The invention provides a method of optical recording and reproduction characterized in that the electrical signal includes an RF signal including information recorded on the recording layer to be reproduced and the noise signal.

The invention provides a method of optical recording and reproduction characterized in that the noise signal is extracted from each of a plurality of recording layers other than the recording layer to be reproduced and in that a differential operation is performed between any selected one of the plurality of extracted noise signals and the electrical signal to extract the RF signal.

The invention makes it possible to provide a light-receiving element, an optical head, and an optical recording/reproducing apparatus which allow a noise component superimposed on reflected light from a multi-layer recording medium to be eliminated to reproduce an RF signal of high quality.

DESCRIPTION OF THE PREFERRED EMBODIMENTS

A description will now be made with reference to FIGS. 1 to 6 on a light-receiving element, an optical head, an optical recording/reproducing apparatus, and a method of optical recording and reproduction according to an embodiment of the invention. First, a schematic configuration of an optical head according to the present embodiment will be described with reference to FIGS. 1 and 2. An optical head 1 has a laser diode 3 to serve as a laser-emitting element which emits laser light. The laser diode 3 can emit laser light having a different optical intensity for each of recording and reproduction based on a control voltage from a controller (not shown).

Figure 1:
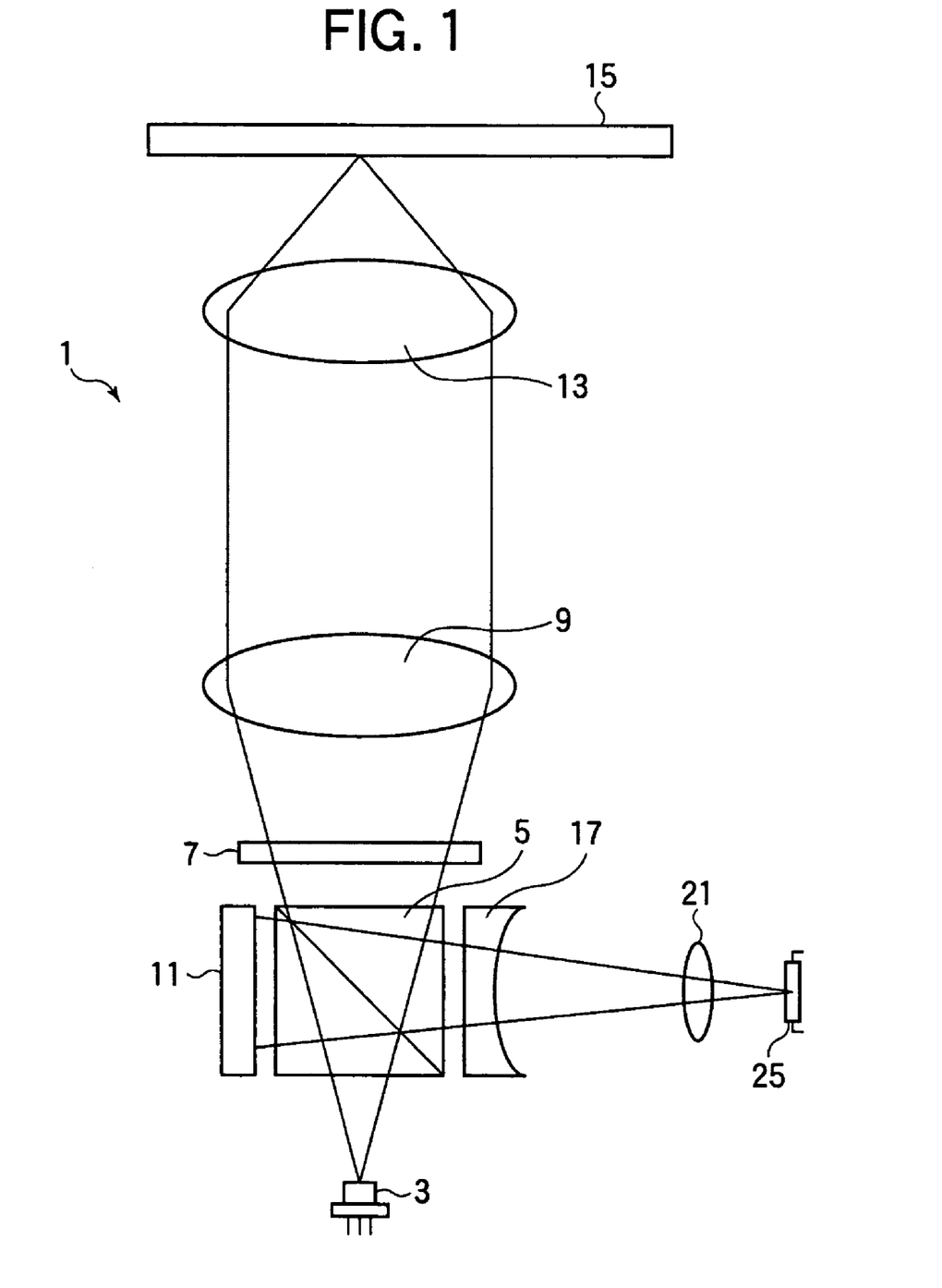
FIG. 1 shows a schematic configuration of an optical head 1 according to an embodiment of the invention.

A polarization beam splitter 5 is disposed in a predetermined position on a light-emitting side of the laser diode 3. A quarter-wave plate 7, a collimator lens 9, and an objective lens 13 are disposed in the order listed on a light-transmitting side of the polarization beam splitter 5 as viewed from the laser diode 3. The collimator lens 9 is provided to transform a divergent pencil of rays from the laser diode 3 into a parallel pencil of rays and to guide the parallel pencil of rays to the objective lens 13, and to transform a parallel pencil of rays from the objective lens 13 into a convergent pencil of rays and to guide a convergent pencil of rays to a light-receiving element 25. The objective lens 13 is provided to converge the parallel pencil of rays from the collimator lens 9 on a predetermined recording layer of a multi-layer optical disk (multi-layer recording medium) 15 having a plurality of recording layers to form a reading spot on the same and to transform reflected light from the multi-layer optical disk 15 into a parallel pencil of rays and to guide the parallel pencil of rays to the collimator lens 9.

A sensor lens 17, a cylindrical lens 21, and a light-receiving element 25 are disposed in the order listed on a light-reflecting side of the polarization beam splitter 5 as viewed from the quarter-wave plate 7. A power-monitoring photodiode 11 for measuring the optical intensity of laser light emitted by the laser diode 3 is disposed on a light-reflecting side of the polarization beam splitter 5 as viewed from the laser diode 3.

The sensor lens 17 serves as a reflected light focus position adjusting section for optically adjusting the position in focus of an optical beam reflected by the multi-layer optical disk 15. The sensor lens 17 enlarges reflected light at a predetermined optical magnification and focuses the same on the light-receiving element 25 through the cylindrical lens 21. An electrical signal obtained by photoelectric conversion at the light-receiving element 25 is input to a differential amplification circuit 31 (see FIG. 5), and an RF signal is reproduced from the electrical signal at the differential amplification circuit 31.

Figure 2:
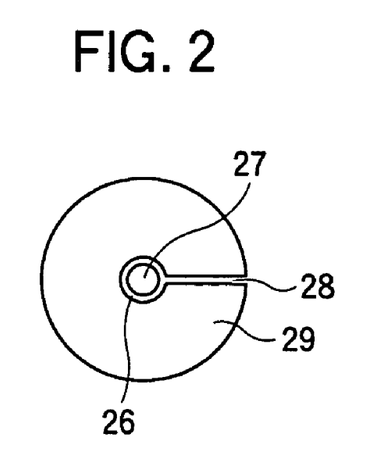
FIG. 2 shows a schematic configuration of a light-receiving section of a light-receiving element 25 according to the embodiment of the invention.

FIG. 2 shows a configuration of light-receiving sections of the light-receiving element 25. As shown in FIG. 2, the light-receiving element 25 includes a first light-receiving section 27 having a circular light-receiving region and a second light-receiving section 29 which is formed around the outer circumference of the first light-receiving section 27 in the form of a concentric circle that is concentric with the circular light-receiving region of the first light-receiving section 27.

The first light-receiving section 27 is disposed such that the center of the circular light-receiving region thereof substantially coincides with the optical axis of a return path optical system which passes through the objective lens 13, collimator lens 9, the quarter-wave plate 7, the beam splitter 5, the sensor lens 17, and the cylindrical lens 21 in the order listed. The first light-receiving section 27 is also disposed such that the light-receiving surface is located in the focusing position of reflected light (reproduced signal light) from a predetermined recording layer from which information is to be reproduced (hereinafter referred to as "reproduced layer") among the plurality of recording layers of the multi-layer optical disk 15. The surface area (represented by $S_1$) of the light-receiving region is optimized to allow the reproduced signal light to be received with a necessary and sufficient intensity. The first light-receiving section 27 also receives reflected light other than the signal light reflected from other recording layers (noise signal light), although in a very small quantity. The second light-receiving section 29 receives noise signal light reflected from recording layers other than the reproduced layer.

An insulation region 26 is provided between the light-receiving regions of the first light-receiving section 27 and the second light-receiving section 29 to keep them insulated from each other. A wiring area 28 is formed in the light-receiving region of the second light-receiving section 29 so as to extend in the radial direction from the center of the region. The wiring area 28 is provided to form a wiring for connecting the first light-receiving section 27 and the differential amplification circuit 31 (see FIG. 5).

Operations of the optical head 1 will now be described with reference to FIGS. 1 and 2. Divergent laser light emitted by the laser diode 3 impinges upon the polarization beam splitter 5. A Linearly polarized component of the light in a predetermined polarization direction is transmitted by the polarization beam splitter 5 to impinge upon the quarter-wave plate 7. A linearly polarized component orthogonal to the above-mentioned polarization direction is reflected to impinge upon the power monitoring photodiode 11, and the intensity of the laser light is thus measured.

The linearly polarized light which has entered the quarter-wave plate 7 is transformed into circularly polarized light by being transmitted through the quarter-wave plate 7. The circularly polarized light is collimated by the collimator lens 9, transmitted by the collimator lens 9, and converged by the objective lens 13. The light is collected and reflected on a layer from which information is to be reproduced among the plurality of recording layers of the multi-layer optical disk 15. At this time, the light is also reflected by recording layers other than the reproduced layer. The circularly polarized light reflected by a plurality of recording layers of the multi-layer optical disk 15 is collimated by the objective lens 13 and transmitted by the collimator lens 9 to impinge upon the quarter-wave plate 7. By being transmitted through the quarter-wave plate 7, the circularly polarized light is transformed into linearly polarized light which impinges upon the polarization beam splitter 5, the polarization direction of the linearly polarized light being at a 90° rotation from that of the initial linearly polarized light. The linearly polarized light is reflected by the polarization beam splitter 5 to impinge upon the sensor lens 17.

After being transmitted by the sensor lens 17, the light is converged on the light-receiving element 25 through the cylindrical lens 21. The first light-receiving section 27 of the light-receiving element 25 receives not only the signal light from the reproduced layer but also the reflected light from the other recording layers which can cause inter-layer crosstalks, although the latter is in a very small quantity. The second light-receiving section 29 receives the reflected light including noise signals from the recording layers other than the reproduced layer.

Figure 3:
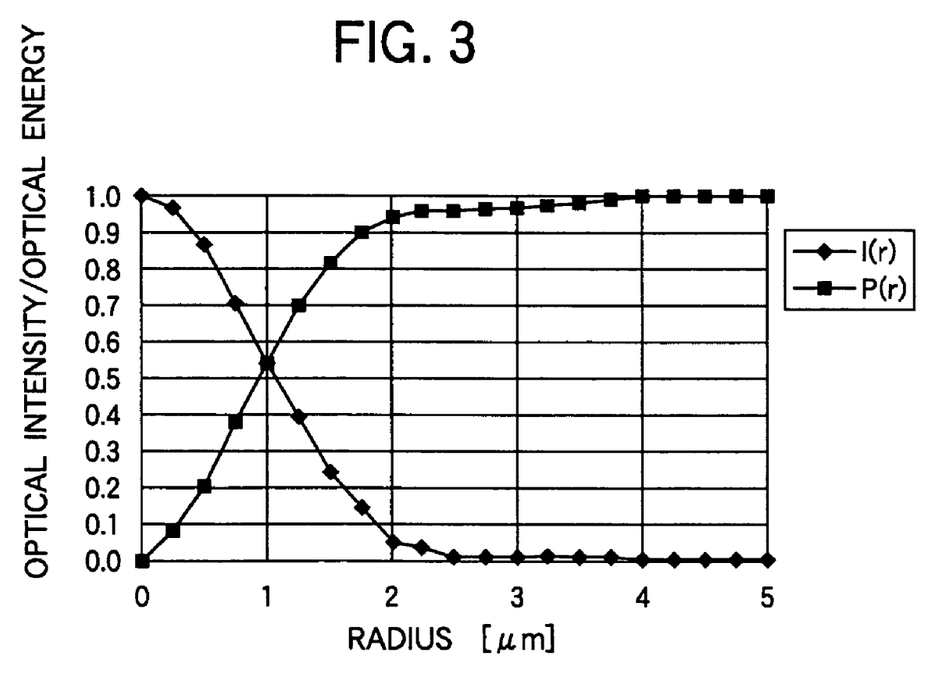
FIG. 3 is a graph showing the intensity distribution and optical energy distribution of focused light received on a light-receiving surface of a first light-receiving section 27 through a return path optical system of the optical head 1 according to the embodiment of the invention.

A description will now be made with reference to FIGS. 3 and 4 on optimization of the shapes and surface areas of the first and second light-receiving sections 27 and 29 of the light-receiving element 25. FIG. 3 shows the intensity distribution and optical energy distribution of focused light that is received on the light-receiving surface of the first light-receiving section 27 through the return path optical system of the optical head 1. In FIG. 3, distances (μm) from the center of the light-receiving region of the first light-receiving section 27 in the radial (r) direction thereof are plotted along the abscissa axis, and the intensity I(r) of the focused light in each position in the radial (r) direction and an integrated value of optical intensities (optical energy P(r)) from the center of the region at each of the radial positions are plotted along the ordinate axis in a normalized manner. In FIG. 3, the intensity I(r) of the focused light is represented by the curve connecting the solid diamonds, and the optical energy P(r) is represented by the curve connecting the solid squares. In the present embodiment, it is assumed that the laser has a wavelength λ of 405 nm and that a light-receiving section on the side of the return path (which depends on the power of the collimator lens 9 and the sensor lens 17) has a numerical aperture NA' that is 0.1.

It is known that the intensity distribution of a light spot in a position in focus is obtained by performing Fourier integration of the intensity distribution of the light incident upon the lens throughout the aperture of the lens and that the extent of the distribution (the diameter of the spot) is proportionate to the ratio of the laser wavelength λ to the numerical aperture NA' of the light-receiving section on the side of the return path (reference document: "General Compilation of Optical Memory and Photomagnetic Memory Technologies", supervised by Yoshifumi Sakurai and Shizuo Tatsuoka, Science Forum pp. 91-, 1983). That is, when the laser wavelength λ and the numerical aperture of the light-receiving section on the side of the return path are represented by λ and NA' respectively as described above, a beam spot on the light-receiving element has a radius R that is expressed by:

$$R = k\lambda/NA' \qquad \text{Expression 1}$$

where k represents a constant determined by the position that is defined as the beam waist. According to the reference document, when it is assumed that a radius where intensity is $e^{-2}$ times the intensity at the center is defined as the beam waist, the radius of the beam spot is 0.41λ/NA', and the constant k in Expression 1 is therefore 0.41. The document indicates that the coefficient is always 0.41 regardless of the wavelength λ of the light source and the numerical aperture NA' of the lens.

However, as shown in FIG. 3, the optical energy P(r) at a radius r (which substantially equals 1.66 μm) where intensity is $e^{-2}$ (which substantially equals 0.135) times the intensity at the center does not reach 90% of the energy of the spot of reflected light. Therefore, in order to receive 90% or more of the reflected light with a sufficient margin, in the example shown in FIG. 3, the light-receiving region must have a radial position where optical intensity is 0.05 times the intensity at the center or a radius r that is substantially equal to or greater than 2 μm. In order to obtain the value of the coefficient k that satisfies such a condition, 2 μm, 0.405 μm, and 0.1 are substituted for R, λ, and NA' in Expression 1 respectively, λ=0.405 and NA'=0.1 being prerequisites for FIG. 3. Then, k=0.5. That is, in order to receive the beam of the reflected light spot effectively, the radius R of the circular light-receiving region is desirably set at 0.5 (λ/NA') or more. As described above, this coefficient always holds regardless of the values of the laser wavelength λ and the numerical aperture NA'.

Figure 4:
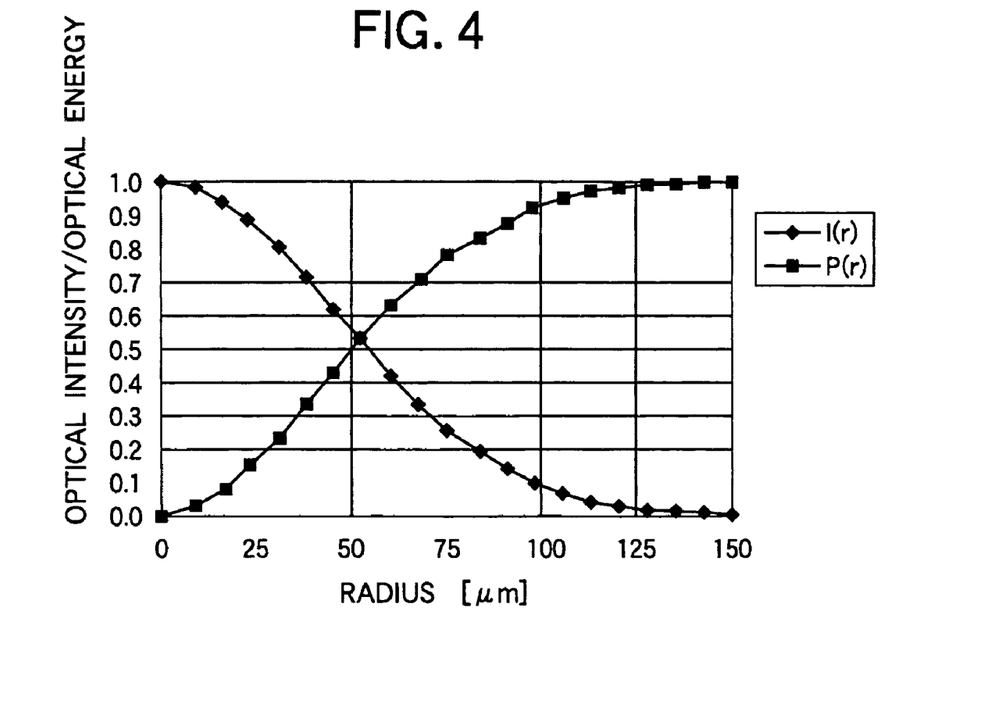
FIG. 4 is a graph showing the intensity distribution and optical energy distribution of defocused light received on light-receiving surfaces of the first light-receiving section 27 and a second light-receiving section 29 through the return path optical system of the optical head 1 according to the embodiment of the invention.

FIG. 4 shows the intensity distribution and optical energy distribution of defocused light that is received on the light-receiving surfaces of the first and second light-receiving sections 27 and 29 through the return path optical system of the optical head 1. In FIG. 4, distances (μm) from the center of the light-receiving region of the first light-receiving section 27 in the radial (r) direction thereof are plotted along the abscissa axis, and the intensity I(r) of the focused light in each position in the radial (r) direction and an integrated value of optical intensities (optical energy P(r)) from the center of the region at each of the radial positions are plotted along the ordinate axis in a normalized manner.

The example shown in FIG. 4 is on assumptions that the distance d between layers among the multiplicity of recording layers of the multi-layer optical disk 15 is 10 μm and that reflected light which is defocused from the focus of a reproduced layer by 20 μm is received in the same position under the same condition as in FIG. 3. It is assumed that a lateral magnification β of the side of the return path is 8.5; the numerical aperture NA' of the side of the return path is 0.1; and the refractive index of a light-transmitting layer constituting a section between recording layers is 1.58.

Let us assume now that d represents the distance between a reproduced layer and a layer adjacent thereto among the plurality of recording layers; n represents the refractive index of the light-transmitting layer between the recording layers; β represents the lateral magnification of the side of the return path; and NA' represents the numerical aperture of the light-receiving section on the side of the return path. Then, reflected light from the adjacent layer impinges upon the light-receiving element on the return path side in a state of defocus, and the amount of the defocus is $2d \cdot \beta^2 \cdot NA'/n$. This is attributable to the fact that the displacement of a defocused image point in the direction of the optical axis is equivalent to the amount of defocus at the side of the object point multiplied by a longitudinal magnification $\beta^2$ (reference document: "Introduction to Optics", Toshiro Kishikawa, The Optronics Co., Ltd. Pp. 26-31, 1990).

Since the radius of the beam incident upon the light-receiving element is proportional to the amount of defocus, when the proportionality factor is represented by k', the radius R of the beam spot on the light-receiving element is expressed by:

$$R = k' \cdot d \cdot \beta^2 \cdot NA'/n \quad \text{Expression 2}$$

In this case, the object of the discussion is the optical intensity distribution in an area beyond the focus position of the lens, and the wavelength of the light source does not contribute so much to the optical intensity distribution different from the case of Expression 1. As apparent from Expression 2, the radius R of the beam spot is the product of the amount of defocus at the side of the image point (the amount of defocus at the side of the medium d/n multiplied by a longitudinal magnification $\beta^2$) and the numerical aperture NA' on the side of the image point, and the value can be calculated on the basis of geometrical optics.

In order to keep noise light entering the first light-receiving section 27 at 5% or less of the total optical energy P of the defocused light (a range in which no abrupt increase occurs in the quantity of the entering noise light), the first light-receiving section 27 must be a region in which the optical intensity I(r) is equal to or greater than 0.96 times the intensity at the center thereof when the section is circular as shown in FIG. 4. That is, the section must be about 11 μm or less in terms of the radius R. When the radius R=11 μm and the parameters defined as prerequisites of FIG. 4 are substituted in Expression 2, the expression is changed into k'=0.24. That is, the radius of the first light-receiving section 27 is desirably set at $(0.24d \cdot \beta^2 \cdot NA'/n)$ or less to prevent a crosstalk between the adjacent layers effectively. A geometrical-optical study revealed that the coefficient k' always holds as a constant independently of the values of the parameters associated with the amount of defocus.

The numerical aperture NA' of the light-receiving section on the side of the return path can be rewritten as $NA' = NA/\beta$ using the numerical aperture NA of the objective lens 13 and the lateral magnification $\beta$ of the optical system. Results of those discussions indicate that an optimum range of the surface area of the first light-receiving section 27 which has a light-receiving region in the innermost circumferential part is expressed by:

$$\pi(0.5\lambda/(NA/\beta))^2 \leq S_1 \leq \pi(0.24d \cdot \beta \cdot NA/n)^2 \quad \text{Expression 3}$$

where $S_1$ represents the surface area of the section 27.

In order to provide a function of eliminating unwanted inter-layer crosstalks from focused light, it is desirable that the light-receiving region of the first light-receiving section 27 has a circular shape.

Referring now to the purpose of the second light-receiving section 29 which is concentric with the circular light-receiving region of the first light-receiving section 27 and disposed adjacent to the outer circumference of the first light-receiving section 27, the section positively receives reflected light from recording layers other than a reproduced layer and performs a differential operation between such components and a signal from the reproduced layer to achieve an improvement in an S/N ratio that is the ratio between RF signal components and noise signal components. Therefore, the light-receiving region of the second light-receiving section 29 must have a size to allow efficient reception of reflected light from recording layers other than a reproduced layer.

However, noise signal components to be eliminated as inter-layer crosstalks are not limited to inter-layer crosstalks from a recording layer adjacent to a reproduced layer, and it is necessary to eliminate noise signal components originating in inter-layer crosstalk signals between reflected light from another recording layer that is adjacent to the above-mentioned recording layer and still another recording layer that is adjacent to the other recording layer. Let us now call the reproduced layer "first recording layer", the recording layer adjacent to the reproduced layer "second recording layer, and so on. Then, reflected light from an m-th recording layer impinges upon the light-receiving element 25 out of focus (in a state of defocus), and the amount of defocus is expressed by $2(m-1) \cdot d \cdot \beta^2 \cdot NA'/n$ using the same parameters as above. The radius of a light beam incident upon the light-receiving element 25 is proportionate to the amount of defocus of the same. Therefore, when a constant k'' is put to represent the proportionality factor including the coefficient "2" in the above expression, the radius R of a beam spot on the light-receiving element 25 can be expressed by:

$$R = k'' \cdot (m-1) \cdot d \cdot \beta^2 \cdot NA'/n \quad \text{Expression 4}$$

As apparent from FIG. 4, in order to detect reflected light from the m-th recording layer with an optical energy intensity I(r) of 0.5 (=50%), an m-th light-receiving region of the second light-receiving section 29 must have a radius of about 50 μm or more on an assumption that the region is circular. When the radius R=50 μm and the parameters defined as prerequisites of FIG. 4 are substituted in Expression 4, the expression is changed into k=1.1. That is, the radius R of the m-th (m≧2) light-receiving region of the second light-receiving section 29 is desirably set at $(1.1(m-1) \cdot d \cdot \beta^2 \cdot NA'/n)$ or more to detect noise signals included in reflected light from the m-th recording layer effectively, the light-receiving region of the first light-receiving section 27 being the first light-receiving region (m=1).

The numerical aperture NA' of a light-receiving section on the side of the return path can be expressed by $NA' = NA/\beta$. Then, when $S_m$ represents the sum of surfaces areas of light-receiving regions from the first light-receiving section 27 up to the m-th light-receiving region, an optimum range of $S_m$ can be expressed by:

$$S_m \geq \pi(1.1(m-1) \cdot d \cdot \beta \cdot NA/n)^2 \quad \text{Expression 5}$$

It is desirable that the m-th light-receiving region in the outermost circumferential section has a circular shape for the same reason as for the first light-receiving section 27 in the innermost circumferential section. However, the restriction on the shape of this light-receiving region is not as strict as that on the shape of the first light-receiving section 27 because any light-receiving part other than the first light-receiving section 27 is used for detecting noise signal components. The light-receiving region may therefore have a different shape such as a square. The function of the light-receiving element 25 is not degraded even in such a case. Therefore, the shape of the second light-receiving section 29 may be appropriately decided in accordance with restrictions on the design of the light-receiving element 25 and the optical head 1.

As described with reference to FIGS. 3 and 4, the radius R of the light-receiving region of the first light-receiving section 27 satisfying Expression 1 is in the range from 2 to 11 μm where $\lambda = 0.405$ μm; NA=0.85; $\beta = 8.5$; d=10 μm; and n=1.58.

Therefore, the surface area $S_1$ of the light-receiving region of the first light-receiving section 27 ranges from 12.6 to 380 ($\mu m^2$). The radius R of the light-receiving region of the second light-receiving section 29 is 50.3 μm when m=2, and the sum $S_m$ of the surface areas of the light-receiving regions of the first and second light-receiving sections 27 and 29 is 7948 ($\mu m^2$) or more.

Figure 5:
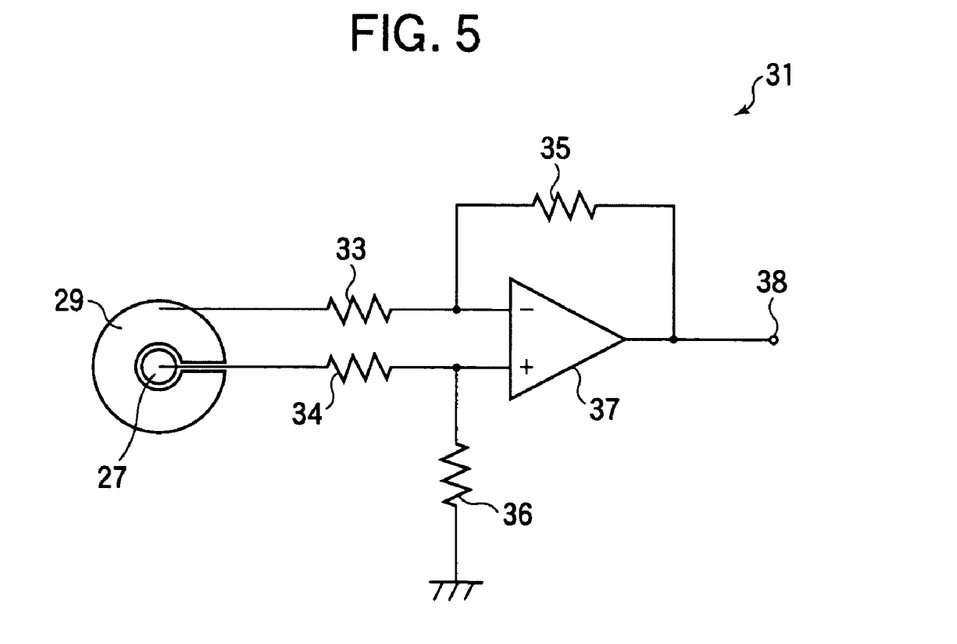
FIG. 5 shows a differential amplification circuit 31 for extracting an RF signal including information recorded on a multi-layer optical disk 15 from an electrical signal output by the light-receiving element 25 according to the embodiment of the invention.

Next, a description will now be made with reference to FIG. 5 on a method of extracting an RF signal including information recorded on a reproduced layer. FIG. 5 shows a differential amplification circuit 31 which is provided in the light-receiving element 25 and which extracts an RF signal including information recorded in the multi-layer optical disk 15 from electrical signals output by the first and second light-receiving sections 27 and 29. The differential amplification circuit 31 has an operational amplifier 37 and resistors 33, 34, 35 and 36 used for protecting the operational amplifier 37 from inputs and for determining the amplification factor of the same. One terminal of the resistor 34 is connected to an output terminal, which is not shown, of the first light-receiving section 27, and another terminal of the resistor 34 is connected to a non-inverting input terminal (+) of the operational amplifier 37. One terminal of the resistor 33 is connected to an output terminal, which is not shown, of the second light-receiving section 29, and another terminal of the resistor 33 is connected to an inverting input terminal (−) of the operational amplifier 37. One terminal of the resistor 35 is connected to an output terminal 38 of the operational amplifier 37, and another terminal of the resistor 35 is connected to the inverting input terminal (−) of the operational amplifier 37. One terminal of the resistor 36 is connected to the non-inverting input terminal (+) of the operational amplifier 37, and another terminal of the resistor 36 is connected to the ground (reference potential). The resistors 33, 34, 35 and 36 have the same resistance. Obviously, the resistance of each of the resistors may be set at a predetermined value to set the amplification factor of the operational amplifier 37 at a predetermined value.

A method of optical recording and reproduction utilizing the differential amplification circuit 31 will now be described with reference to FIG. 5. The light-receiving region of the first light-receiving section 27 of the light-receiving element 25 has a shape and a surface area which are determined such that reflected light from a reproduced layer of the multi-layer optical disk 15 can be received when the disk is irradiated with laser light. However, as shown in FIG. 4, some of the light received by the light-receiving region (having a radius R=2 to 11 μm) of the first light-receiving section 27 includes noise components which are generated in reflected light (return light) from recording layers other than the reproduced layer. Referring to FIG. 4, for example, the light constituting noise components included in the light received by the first light-receiving section 27 is equivalent to about 0.5% of optical energy P(r) received by the second light-receiving section 29. Therefore, an electrical signal obtained by photoelectrically converting the light received by the first light-receiving section 27 includes an RF signal and a noise signal originating in inter-layer crosstalks that occur between the reflected light from the reproduced layer and the return light from recording layers other than the reproduced layer. As a result, the frequency of the electrical signal output from the first light-receiving section 27 includes the frequency of the noise signal (a low frequency) and the frequency of the RF signal (a high frequency).

The shape and the surface area of the light-receiving region of the second light-receiving section 29 are determined such that reflected light from recording layers other than the reproduced layer can be received. Thus, an electrical signal obtained by photoelectrically converting the light received by the second light-receiving section 29 includes only a noise signal which causes inter-layer crosstalks between the reflected light from the reproduced layer and the return light from recording layers other than the reproduced layer. As a result, the frequency of the signal output from the second light-receiving section 29 is equivalent to the frequency of the noise signal. Therefore, the frequency of the electrical signal output from the first light-receiving section 27 includes the frequency of the noise signal output from the second light-receiving section 29. The electrical signal including an RF signal and a noise signal obtained by photoelectrical conversion at the first light-receiving section 27 is input to the non-inverting input terminal (+) of the operational amplifier 37 through the resistor 34. The noise signal obtained by photoelectrical conversion at the second light-receiving section 29 is input to the inverting input terminal (−) of the operational amplifier 37 through the resistor 33. The operational amplifier 37 performs a differential operation between the electrical signal and the noise signal to extract only the RF signal and output the RF signal from the output terminal 38.

As thus described, the optical head 1 of the present embodiment has the light-receiving element 25 including the circular first light-receiving section 27 and the second light-receiving section 29 disposed adjacent to the outer circumference of the first light-receiving section 27. The light-receiving element 25 is disposed in the vicinity of the focusing point of the return path optical system such that the center of the first light-receiving section 27 coincides with the focal point section. As a result, the first light-receiving section 27 can receive reflected light including an RF signal reflected by a reproduced layer of the multi-layer optical disk 15 and a noise signal attributable to an inter-layer crosstalk, and the second light-receiving section 29 can receive reflected light including a noise signal reflected by information recording layers other than the reproduced layer. Therefore, an RF signal can be reproduced with high quality by performing a differential operation by the differential amplification circuit 31 between an electrical signal obtained by photoelectrically converting the light received by the first light-receiving section 27 and a noise signal obtained by photoelectrically converting the light received by the second light-receiving section 29. Since the light-receiving regions of the first and second light-receiving sections 27 and 29 can be formed with optimum surface areas taking the optical system of the optical head 1 and the inter-layer distance of the multi-layer optical disk 15 into consideration, the optical head 1 and the light-receiving elements 25 can be made compact.

Figure 6:
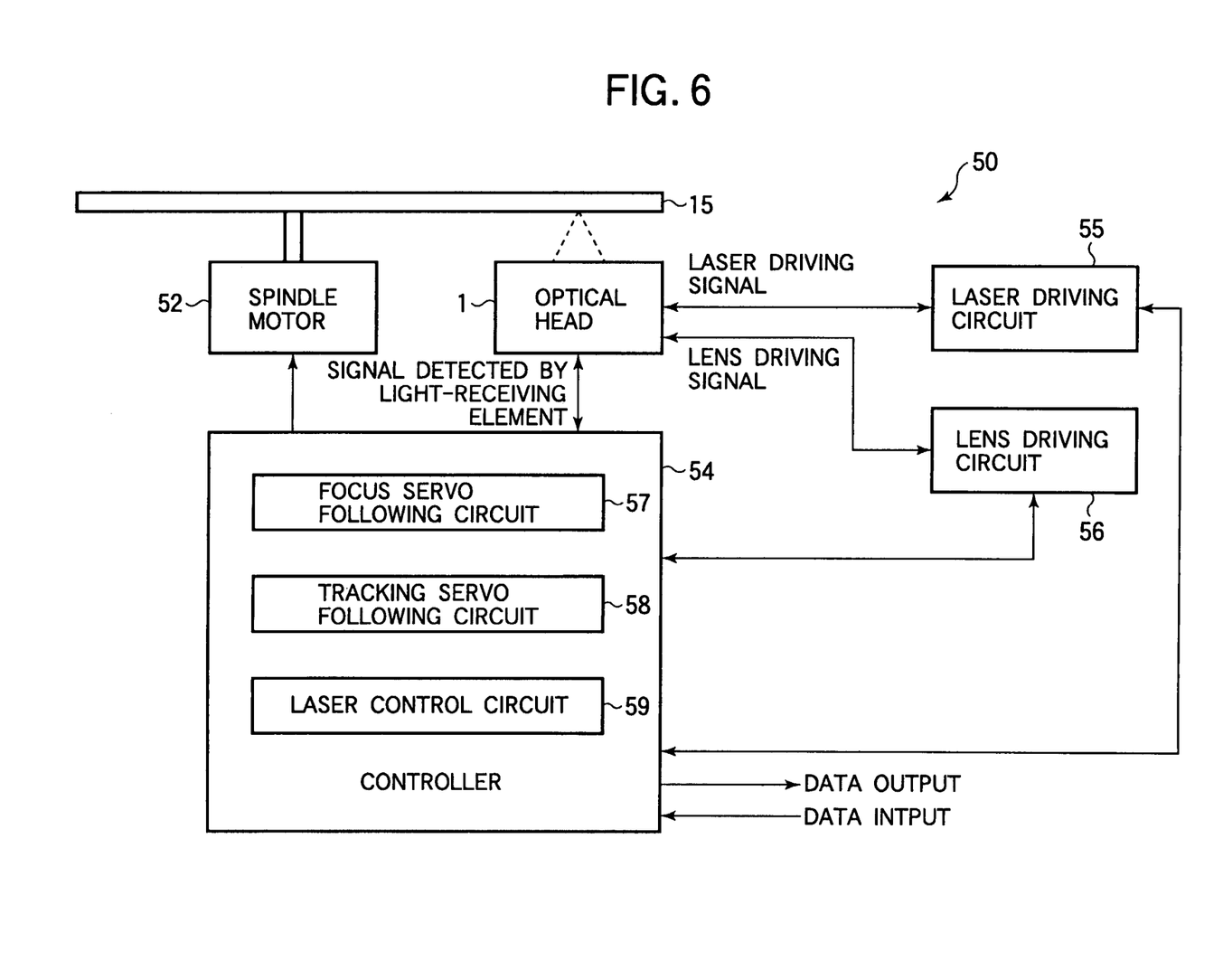
FIG. 6 shows a schematic configuration of an optical recording/reproducing apparatus 50 according to the embodiment of the invention.

FIG. 6 shows a schematic configuration of an optical recording/reproducing apparatus 50 loaded with an optical head 1 according to the present embodiment. As shown in FIG. 6, the optical recording/reproducing apparatus 50 has a spindle motor 52 for rotating a multi-layer optical disk 15, the optical head 1 for irradiating the multi-layer optical disk 15 with a laser beam and for receiving reflected light from the same, a controller 54 for controlling the operation of the spindle motor 52 and the optical head 1, a laser driving circuit 55 for supplying a laser driving signal to the optical head 1, and a lens driving circuit 56 for supplying a lens driving signal to the optical head 1.

The controller 54 includes a focus servo following circuit 57, a tracking servo following circuit 58, and a laser control circuit 59. When the focus servo following circuit 57 is activated, an information recording surface of the multi-layer optical disk 15 that is rotating is focused. When the tracking servo following circuit 58 is activated, a laser beam spot automatically follows up an eccentric signal track of the multi-layer optical disk 15. The focus servo following circuit 57 and the tracking servo following circuit 58 are provided with an automatic gain control function for automatically adjusting a focus gain and a tracking gain, respectively. The laser control circuit 59 is a circuit for generating the laser driving signal supplied from the laser driving circuit 55, and the circuit generates a proper laser driving signal based on recording condition setting information that is recorded in the multi-layer optical disk 15.

It is not essential that the focus servo following circuit 57, the tracking servo following circuit 58, and the laser control circuit 59 are circuits incorporated in the controller 54, and the circuits may be components separate from the controller 54. Further, it is not essential that the circuits are physical circuits, and they may be programs executed in the controller 54.

Figure 7:
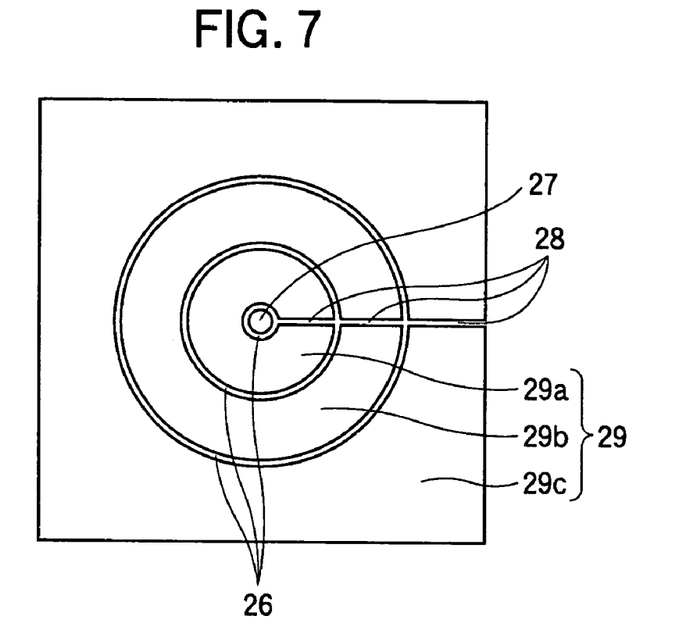
FIG. 7 shows a schematic configuration of light-receiving sections which are a modification of the light-receiving element 25 according to the embodiment of the invention.
Figure 8:
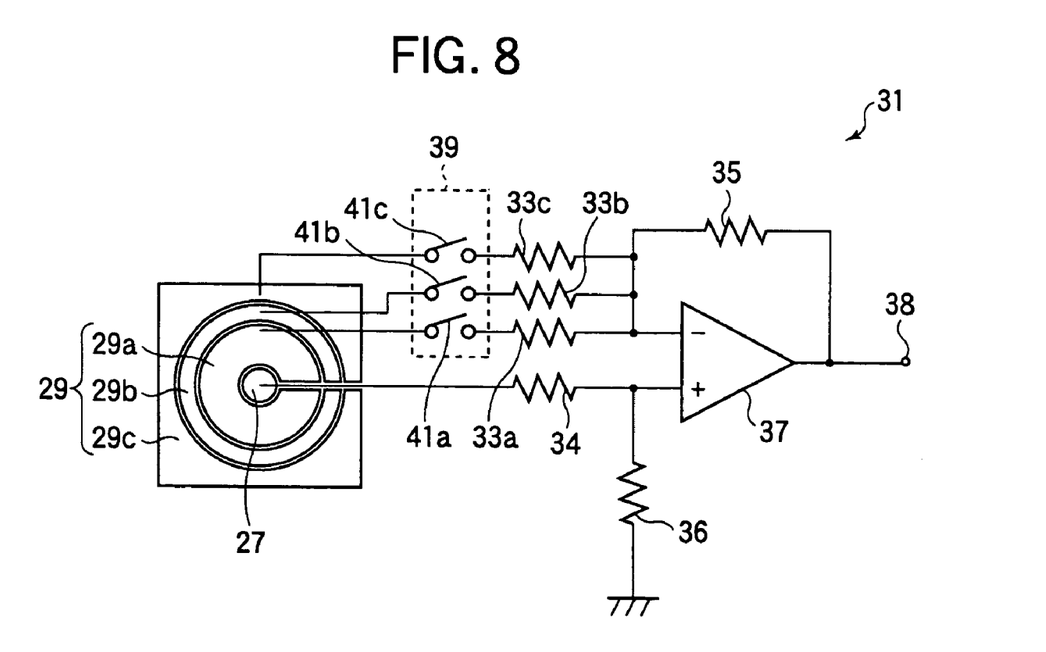
FIG. 8 shows a differential amplification circuit 31 which is a modification of the optical head 1 according to the embodiment of the invention.

A modification of the embodiment will now be described with reference to FIGS. 7 and 8. FIG. 7 shows a configuration of a light-receiving section of a light-receiving element 25 of the present modification. As shown in FIG. 7, the light-receiving element 25 has a first light-receiving section 27 and a second light-receiving section 29 whose light-receiving region has three divisions. The second light-receiving section 29 has light-receiving regions 29a, 29b and 29c which are concentric with the first light-receiving section 27. The light-receiving region 29a is formed around the outer circumference of a light-receiving region of the first light-receiving section 27 in the form of a circle concentric therewith. The light-receiving region 29b is formed around the outer circumference of the light-receiving region 29a in the form of a concentric circle. The light-receiving region 29c, which has a square outer circumference, is formed around the outer circumference of the light-receiving region 29b. An insulation region 26 is provided between the light-receiving regions of the first light-receiving section 27 and the second light-receiving section 29 to keep them insulated from each other. A wiring region 28, which extends from the center of the element in the radial direction thereof, is formed in the light-receiving regions 29a, 29b and 29c. The wiring region 28 is provided to form wirings for connecting the first and second light-receiving sections 27 and 29 with a differential amplification circuit 31.

The surface areas of the light receiving regions of the first and second light-receiving sections 27 and 29 are adjusted according to Expressions 1 and 5 described in the embodiment. The parameter m in Expression 5 has values 2, 3 and 4 for the light-receiving regions 29a, 29b and 29c, respectively. Therefore, when the values of the other parameters in the above embodiment are used, the radius R of the light-receiving region 29a is 50.3 μm or more according to Expression 5. Similarly, the radius R of the light-receiving region 29b is 100.6 μm or more, and the length of one side of the light-receiving region 29c is 301.8 (=150.9×2) μm. Therefore, the light-receiving element 25 has a total area $S_m$ of 71536 (μm$^2$) or more.

Next, a description will now be made with reference to FIG. 8 on a method of extracting an RF signal including information recorded on a reproduced layer. FIG. 8 shows a circuit configuration of the differential amplification circuit 31 in the present modification. As shown in FIG. 8, the differential amplification circuit 31 has a noise signal selection circuit 39, an operational amplifier 37 and resistors 33a, 33b, 33c, 34, 35 and 36 used for protecting inputs to the operational amplifier 37 and for determining the amplification factor of the same. Noise signals based on light received by the light-receiving regions 29a, 29b and 29c can be selectively input to the operational amplifier 37 of the operational amplification circuit 31 by a noise signal selection circuit 39.

The noise signal selection circuit 39 has switches 41a, 41b and 41c. One terminal of each of the switches 41a, 41b and 41c is connected to an output terminal (which is not shown) of the light-receiving regions 29a, 29b and 29c, respectively. Another terminal of each of the switches 41a, 41b and 41c is connected to one terminal of the resistors 33a, 33b and 33c, respectively. Another terminal of each of the resistors 33a, 33b and 33c is connected to an inverting input terminal (−) of the operational amplifier 37. Another terminal of the resistor 34 is connected to a non-inverting input terminal (+) of the operational amplifier 37. One terminal of the resistor 35 is connected to an output terminal 38 of the operational amplifier 37, and another terminal of the resistor 35 is connected to the inverting input terminal (−) of the operational amplifier 37. One terminal of the resistor 36 is connected to the non-inverting input terminal (+) of the operational amplifier 37, and another terminal of the resistor 36 is connected to the ground. The resistors 33a, 33b, 33c, 34, 35 and 36 have the same resistance. Obviously, the resistance of each of the resistors may be set at a predetermined value respectively to set the amplification factor of the operational amplifier 37 at a predetermined value.

Noise signals to be eliminated when an RF signal is being reproduced are not limited to noise signals attributable to inter-layer crosstalks that occur between reflected light from a reproduced layer and reflected light from a recording layer adjacent to the reproduced layer. In the present modification, the second light-receiving section 29 is provided with the three light-receiving regions 29a, 29b and 29c such that reflected light from each of recording layers of a multi-layer optical disk 15 can be received. Further, the switches 41a, 41b and 41c are connected to the light-receiving regions 29a, 29b and 29c, respectively, to allow noise signals output by the light-receiving regions 29a, 29b and 29c to be selectively input to the operational amplifier 37. As a result, noise signals included in light received by the first light-receiving section 27 can be sufficiently eliminated to reproduce an RF signal of high quality. It is not essential that noise signals are input to the operational amplifier 37 from any one of the light-receiving regions 29a, 29b and 29c, and two or all of the switches 41a, 41b and 41c may be turned on.

As thus described, according to the present modification, since noise signals that degrade the S/N ratio of a reproduced signal can be selectively eliminated, an RF signal of higher quality can be reproduced.

Another modification of the embodiment will now be described. With the differential amplification circuit 31 of the above modification, an RF signal can be reproduced by performing a differential operation between an electrical signal output by the first light-receiving section 27 and a noise signal selected by the noise signal selection circuit 39 from among outputs of the light-receiving regions 29a, 29b, and 29c. On the contrary, a differential amplification circuit 31 of the present modification is characterized in that it has a switch (not shown) which switchably connects the other terminal of the resistor 34 to either of the non-inverting input terminal (+) or the inverting input terminal (−) of the operational amplifier 37 with one terminal of the resistor 36 kept connected to the non-inverting input terminal (+) of the operational amplifier 37 and an input terminal (not shown) to which an output signal from a control circuit or logic circuit (not shown) is input. The opening and closing of the switch is controlled by logical inputs from the control circuit.

When the other terminal of the resistor 34 is connected to the non-inverting input terminal (+) of the operational amplifier 37, the differential amplification circuit 31 operates as a differential amplification circuit just as in the above-described modification. The circuit 31 operates as an adding circuit (arithmetic circuit section) when the other terminal of the resistor 34 is connected to the inverting input terminal (−) of the operational amplifier 37. When the differential amplification circuit 31 is operated as an adding circuit, an electrical signal output by the first light-receiving section 27 and a noise signal selected by the noise signal selection circuit 39 from among outputs of the light-receiving regions 29a, 29b and 29c can be added as occasions demand, and a signal (voltage) obtained by the addition can be output from the output terminal 38. Therefore, the light-receiving element 25 having the first light-receiving section 27 and the second light-receiving section 29 with the divisional light-receiving regions 29a, 29b and 29c can be used as a light-receiving element for monitoring laser power when connected with the differential amplification circuit 31 of the present modification. As a result, the manufacturing cost of the optical head 1 can be reduced because a single light-receiving element can be used to provide functions of both a light-receiving element 25 for extracting an RF signal and a power-monitoring photodiode 11 for front-end monitoring.

What is claimed is:

1. A light-receiving element for receiving a reflection of laser light irradiated through an objective lens to a rotating multi-layer recording medium having a plurality of information recording layers stacked one over another through a return path optical system and converting the reflected light into an electrical signal, the light-receiving element comprising:
   a first light-receiving section having a circular light-receiving region; and
   a second light-receiving section disposed adjacent to an outer circumference of the first light-receiving section, wherein a following relational expression is satisfied:

$$\pi(0.5\lambda/(NA/\beta))^2 \leq S_1 \leq \pi(0.24 d \cdot \beta \cdot NA/n)^2$$

where $\lambda$ represents the wavelength of the laser light; d represents the distance between recording layers of the multi-layer recording medium; n represents the refractive index of a light-transmitting layer between the recording layers; NA represents the numerical aperture of the objective lens; $\beta$ represents the lateral magnification of the return path optical system; and $S_1$ represents the surface area of the light-receiving region of the first light-receiving section.

2. A light-receiving element according to claim 1, wherein a frequency band of an electrical signal output from the first light-receiving section includes a frequency band of an electrical signal output from the second light-receiving section.

3. A light-receiving element according to claim 1, wherein a light-receiving region of the second light-receiving section is formed in a form of a concentric circle around the outer circumference of the first light-receiving section.

4. A light-receiving element according to claim 3, wherein a following relational expression is satisfied:

$$S_m \geq \pi(1.1(m-1) \cdot d \cdot \beta \cdot NA/n)^2$$

where $S_m$ represents a sum of the surface area of the light-receiving region of the first light-receiving section and the surface area of the light-receiving region of the second light-receiving section up to the light-receiving region that is in an m-th place (m≧2) when counted from the light-receiving region of the first light-receiving section.

5. A light-receiving element according to claim 1, further comprising a differential amplification circuit having a non-inverting input terminal to which the electrical signal output from the first light-receiving section is input and an inverting input terminal to which a noise signal output from the second light-receiving section is input, the differential amplification circuit performing a differential operation between the electrical signal and the noise signal.

6. A light-receiving element according to claim 5, wherein the noise signal originates in an inter-layer crosstalk that occurs between reflected light from a recording layer of the multi-layer recording medium to be reproduced and reflected light from a recording layer of the multi-layer recording medium other than the recording layer to be reproduced.

7. A light-receiving element according to claim 5, wherein the electrical signal includes an RF signal including information recorded on the recording layer to be reproduced and the noise signal.

8. A light-receiving element according to claim 5, wherein the differential amplification circuit has a noise signal selection circuit for selecting a noise signal output from the light-receiving region of the second light-receiving section in the m-th (m≧2) place when counted from the first light-receiving section toward the outer circumference of the element.

9. A light-receiving element according to claim 8, wherein the differential amplification circuit has a switch for switching the electrical signal to input the signal to either the non-inverting input terminal or the inverting input terminal, an arithmetic circuit section for performing a calculation on the electrical signal and the noise signal selected by the noise signal selection circuit, and an output terminal from which a signal obtained by the calculation at the arithmetic circuit section is output.

10. A light-receiving element according to claim 9, wherein the differential amplification circuit has an input terminal to which an output signal from a logic circuit is input and the opening and closing of the switch is controlled by a logical input from the logic circuit.

11. An optical head comprising a light-receiving element according to claim 1.

12. An optical head according to claim 11, wherein the light-receiving element is used as a light-receiving element for monitoring laser power.

13. An optical recording/reproducing apparatus comprising an optical head according to claim 11.

* * * * *